Patented June 8, 1954

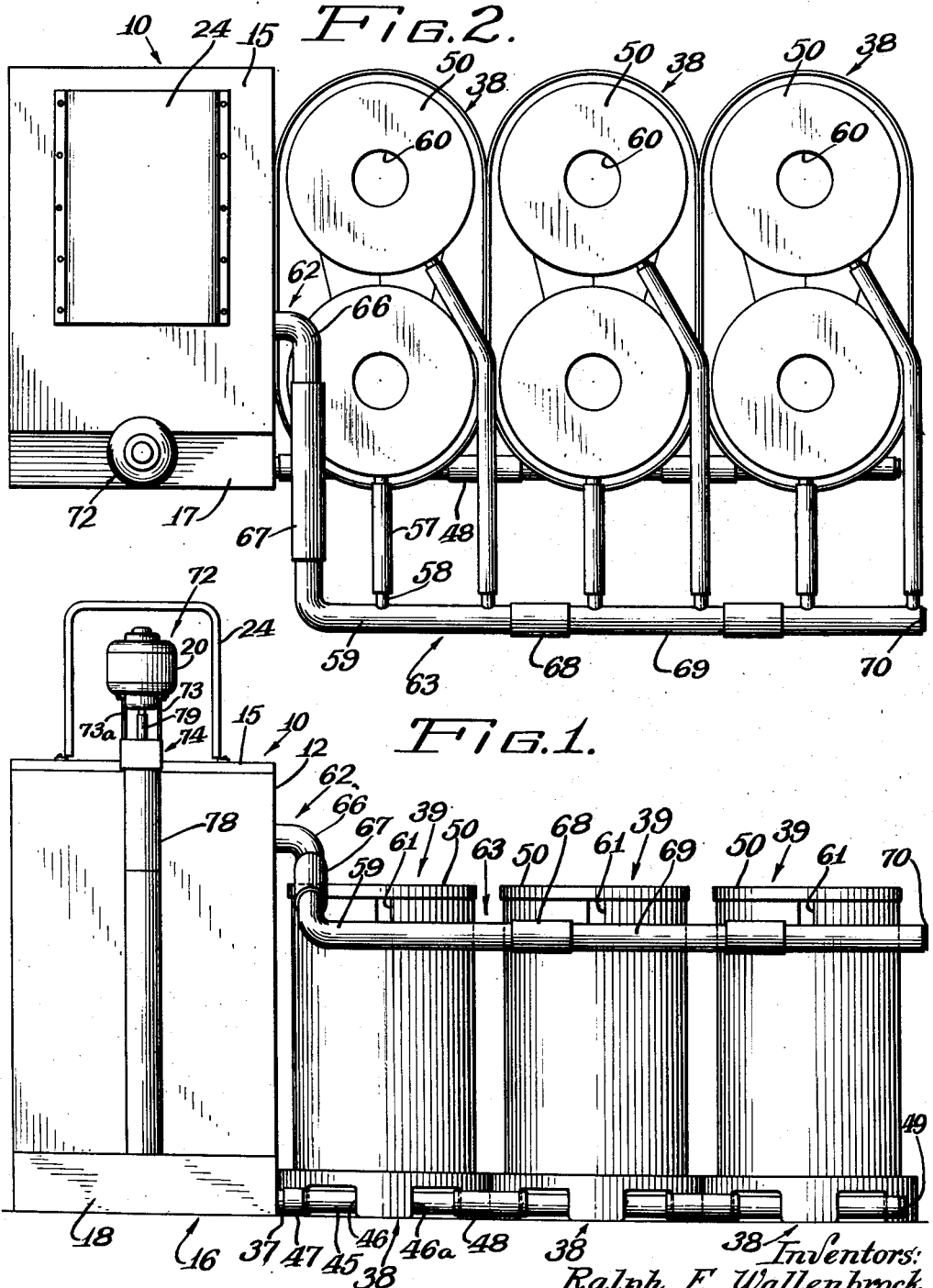

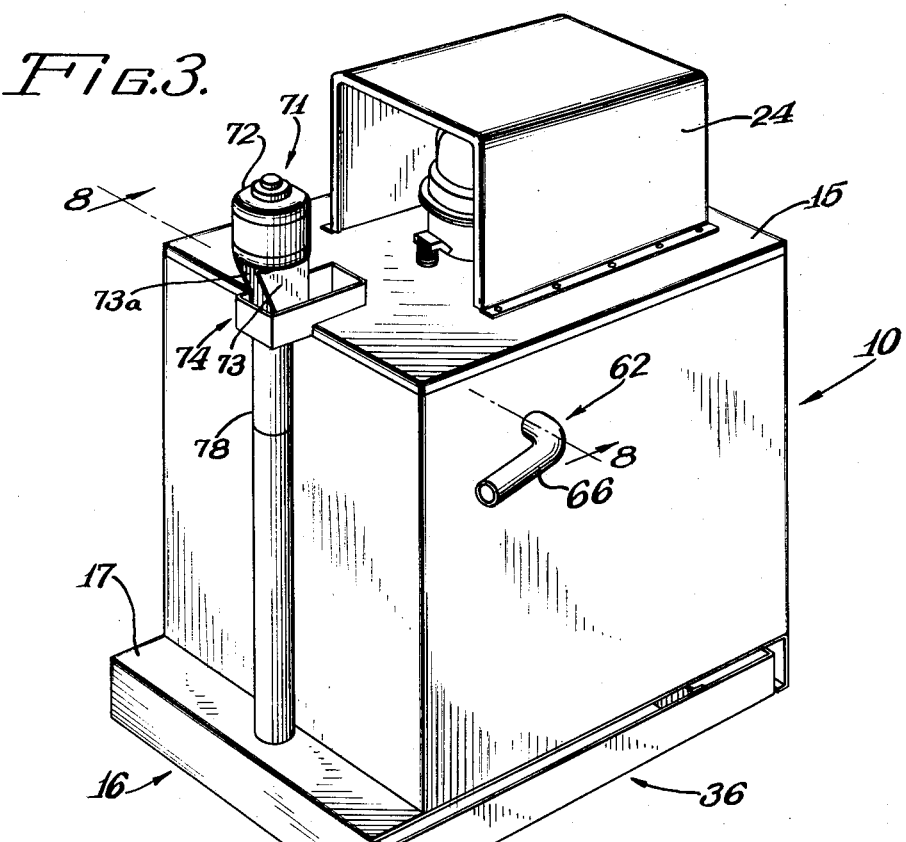
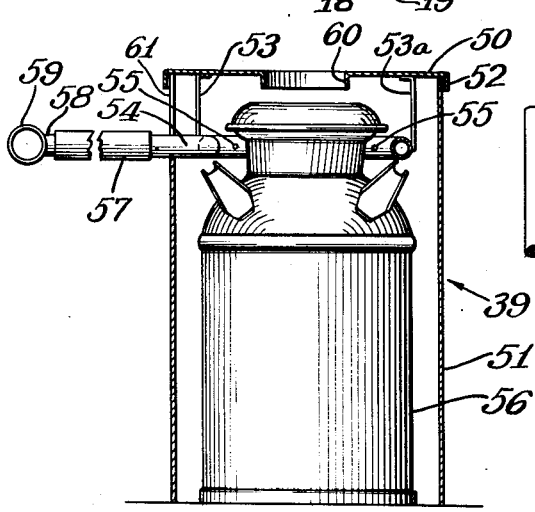
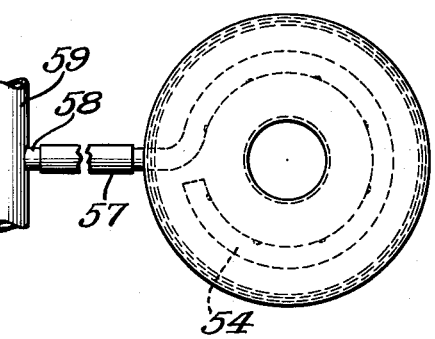

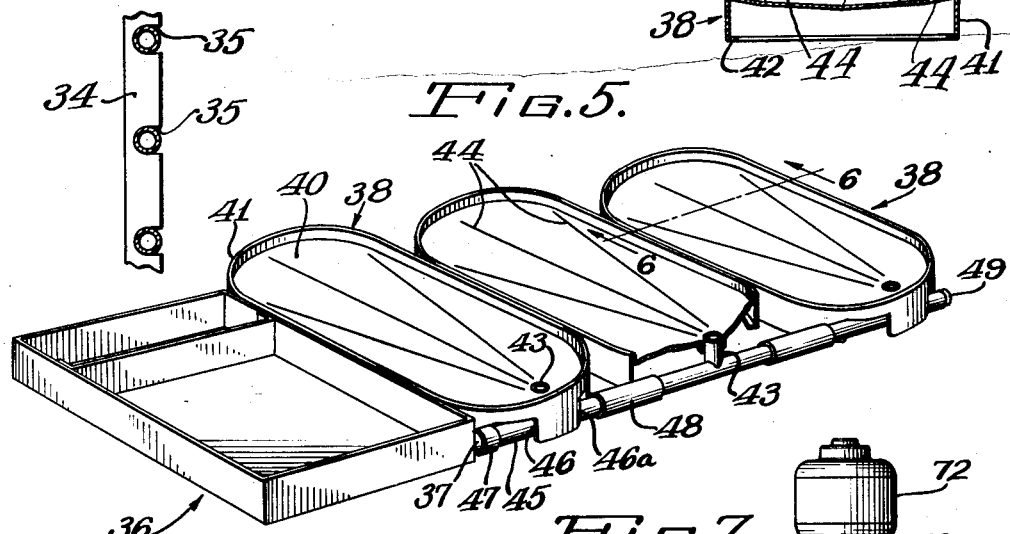
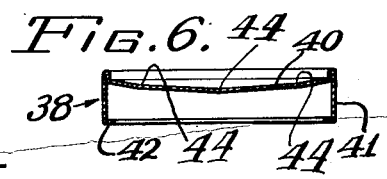
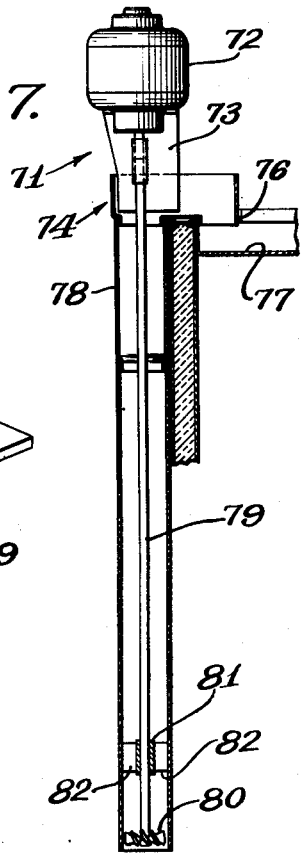
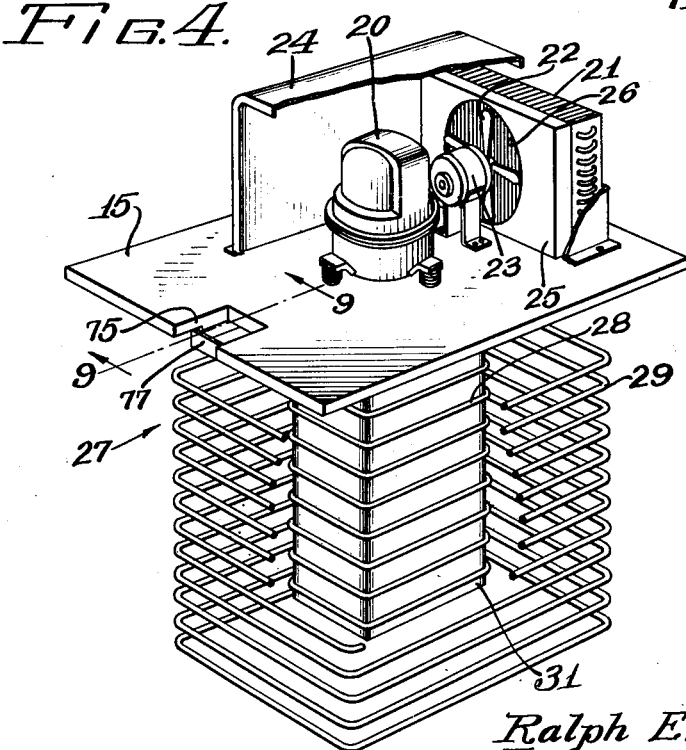
Inventors:
Ralph E. Wallenbrock
Eugene E. Kightly

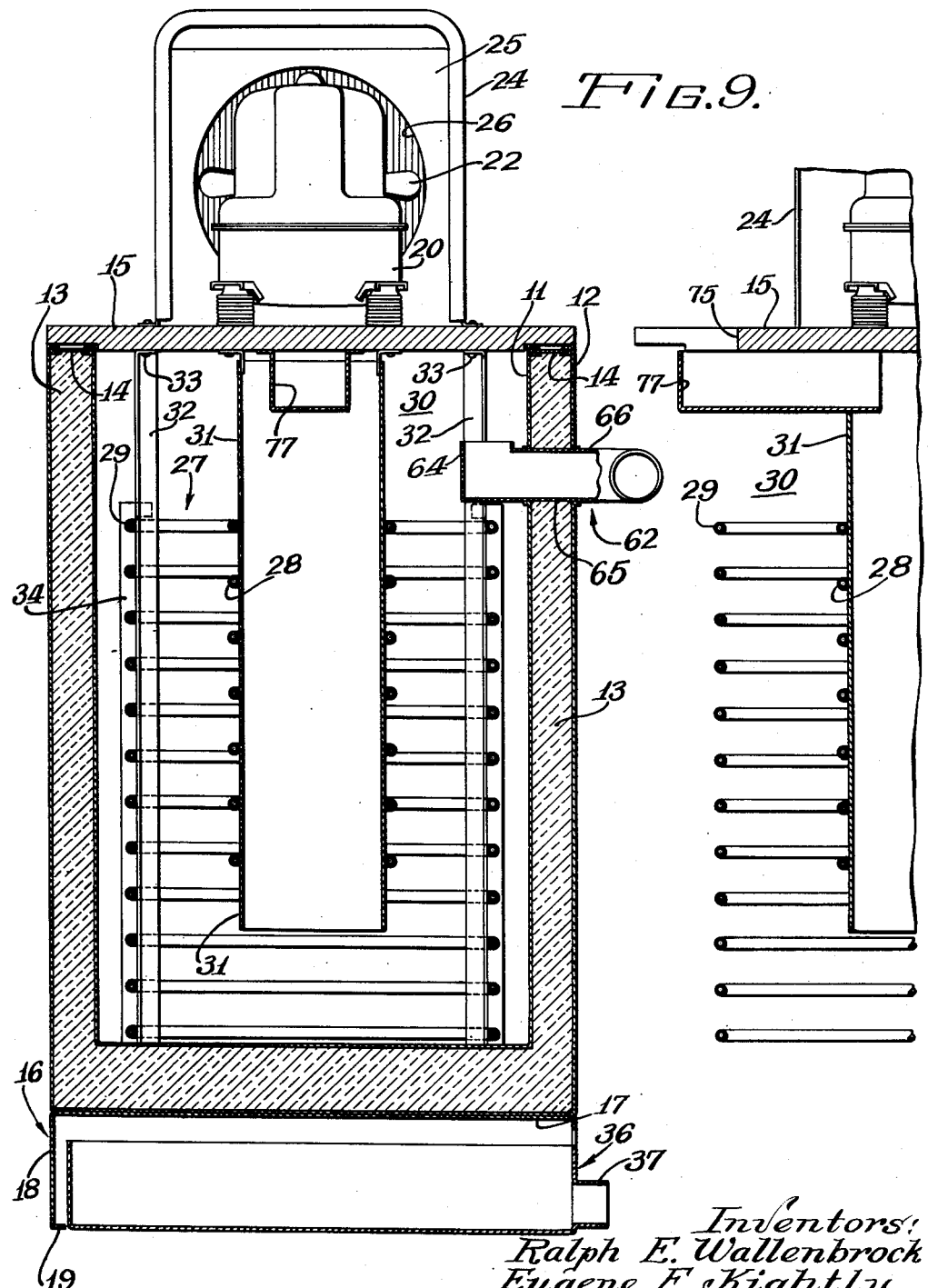

2,680,356

UNITED STATES PATENT OFFICE 2,680,356

SPRAY-TYPE EXPANSIBLE MILK COOLER

Ralph E. Wallenbrock and Eugene E. Kightly, Evansville, Ind., assignors to International Harvester Company, a corporation of New Jersey Application January 31, 1952, Serial No. 269,186

12 Claims. (Cl. 62—141)

This invention relates to apparatus for the cooling of liquids, but is more particularly directed to milk coolers of the type wherein a chilled liquid is sprayed or otherwise circulated over receptacles containing milk to be cooled.

When milk is first received from the animal it is usually relatively warm (approximately 95° F.) and contains a bacterial count which, if not soon thereafter brought under control by lowering the temperature thereof to the vicinity of 50° F., may rise to unhealthy proportions. Because of the scattered locations of farms the time and distance factor is usually such that it is impracticable to have the milk collected and delivered to centrally located cold storage, refrigeration or pasteurizing plants in time to properly limit multiplication of bacteria and thus control the bacterial growth therewithin. Accordingly, the farmer or dairy man generally utilizes some form of cooling device for reducing the temperature of the milk, in accordance with well established health and sanitation standards, as soon after it is drawn as is practicable. In fact in the most recent development the milk is passed directly from the animal, by way of conduit lines, to cooling apparatus so that the cooling thereof commences immediately after being drawn. In the past cooling devices employed for such cooling operations have taken many forms, but in more recent years two general types of milk coolers, particularly adaptable for farm use, have found considerable favor.

In one such cooler, generally referred to as the immersion type, the cans containing the fresh warm milk are immersed in a reservoir of cooled liquid, such as water, disposed within a thermally insulated cabinet. The water in the reservoir is cooled by refrigerating apparatus associated therewith and the cooled water is continuously circulated throughout said cabinet. During off periods, such as the time between milkings, an ice bank is permitted to form around the refrigerant evaporator coils located within the reservoir in the cabinet so that additional or reserve refrigeration capacity will be temporarily available to handle the abnormal load encountered when the cooler is subsequently filled within a short period of time with many cans containing warm milk.

In the second type of prior art cooler a chilled liquid, such as water, is sprayed in a continuous stream or film over the cans containing the warm milk and the spent fluid is then collected, recirculated through a reservoir of coolant liquid, in turn cooled by refrigerating apparatus, and then recirculated and sprayed once again over the cans in a substantially continuous cycle. In this type, as in the former instance, an ice bank is usually permitted to form in the cooling liquid reservoir and thus is likewise available to provide latent or reserve refrigeration capacity when the cooler subsequently is loaded with warm milk.

Even though both of the foregoing types of coolers effectively accomplish the objective of cooling milk in accordance with prescribed standards of time and temperatures, they are burdened with many inherently objectional features which strongly militate against their further extensive use and acceptance. Since the insulated cabinet thereof must be sufficiently large to accommodate and contain the maximum number of milk cans which the cooler is designed to chill at one time the overall dimensions of the cooler must, of necessity, be quite large; hence such coolers are unnecessarily bulky and occupy a maximum of space, and, because of their bulk, are not readily movable from place to place. Furthermore, the construction thereof is costly and, at times, the overall cost of such cooler units becomes prohibitive. In addition, since they are built as permanent and integral units the components thereof are not readily removable or otherwise easily available for servicing. Also, in the former, the cabinet being of the top-opening type each milk can is required to be lifted a considerable heighth off the floor in order to insert it through said top opening and into the cooling liquid, and vice versa when the can is removed therefrom; hence the physical energy required for such operations naturally restricts the use of such a cooler to a person having substantial physical strength.

The present invention, which proposes a cooler employing an insulated cabinet having refrigerating apparatus and a cooling liquid reservoir therein connected by fluid distribution and return conduits to spray headers for circulating chilled liquid over milk cans disposed in spaced relation with respect to said cabinet, provides a milk cooler that readily circumvents all the foregoing objections of previous coolers and thus offers a liquid cooling device that is not handicapped by any of the inherent drawbacks of the noted prior art devices employed for such purposes. Furthermore, the presently proposed arrangement provides a liquid cooler that is extremely flexible in use because the capacity thereof may be expanded or contracted, as desired, without effecting permanent changes in the structure thereof.

It is a principal object of this invention, therefore, to provide an improved liquid cooling device wherein a chilled or cooled liquid is passed into heat exchange relation with an article to be cooled.

Another object is to provide an expansible spray-type milk cooler.

A further object is to provide an improved spray-type cooler wherein receptacles containing a liquid to be cooled are disposed in spaced relation to and outside the walls of a cabinet containing other components of refrigerating apparatus associated therewith.

A still further object is to provide an efficient and economical milk cooler that occupies a minimum of space.

Another object is to provide an improved light weight spray-type of liquid cooler.

A further important object is to provide a liquid cooling device wherein the liquid to be cooled is disposed in receptacles enclosed by shroud-like covers having liquid spraying means therewithin through which cooled liquid is sprayed over said receptacles, and wherein the containers and shrouds, in turn, are positioned in spaced relation with respect to a cabinet carrying the components of a refrigeration system which chills the coolant liquid that is sprayed over said receptacles.

Another important object is to provide a milk cooler in which relatively little lifting is required in loading and unloading the cooler with cans containing milk.

A further object is to provide milk cooling apparatus wherein a coolant liquid is cooled in a reservoir disposed in a cabinet, distributed by conduit means to a shroud-like cover remote from said cabinet where it is brought into heat exchange relation with a receptacle containing milk to be cooled, collected in a sump-like basin beneath said shroud, and then returned by conduit to said reservoir for recooling and recirculation.

A yet still further object is to provide liquid cooling apparatus in which a receptacle adapted to receive liquid to be cooled is sprayed by a coolant fluid that is cooled by refrigerating apparatus disposed in a cabinet removed from said receptacle.

The foregoing and other objects and features of the invention will become apparent as the disclosure is more fully made in the following detailed description of a preferred embodiment of the invention as illustrated in the accompanying sheets of drawings in which:

Fig. 1 is a view showing the front elevation of a cooler constructed in accordance with the present invention.

Fig. 2 shows the top plan view of the proposed cooler.

Fig. 3 is a perspective view of the cabinet containing the refrigerating apparatus and cooling liquid reservoir.

Fig. 4 is a cut-away perspective of the condensing unit and evaporator assembly associated with the cabinet assembly illustrated in Fig. 3.

Fig. 5 is a perspective of the cooling liquid collecting basins and the sump reservoir with which the basins connect.

Fig. 6 is a section taken on line 6—6 of Fig. 5.

Fig. 7 is a view, partially in section, showing the pump structure for elevating the cooling liquid out of the sump reservoir.

Fig. 8 is a vertical sectional view taken along the line 8—8 of Fig. 3.

Fig. 9 is a vertical section taken along the line 9—9 of Fig. 4.

Fig. 10 is a sectional view of a shroud-like cover having a shower member therein for spraying coolant liquid over articles such as milk cans disposed therebeneath.

Fig. 11 is a top plan view of the shroud depicted in Fig. 10.

Fig. 12 is a cut-away detail of the supporting arrangement for a section of the evaporator coil.

Figure 13:
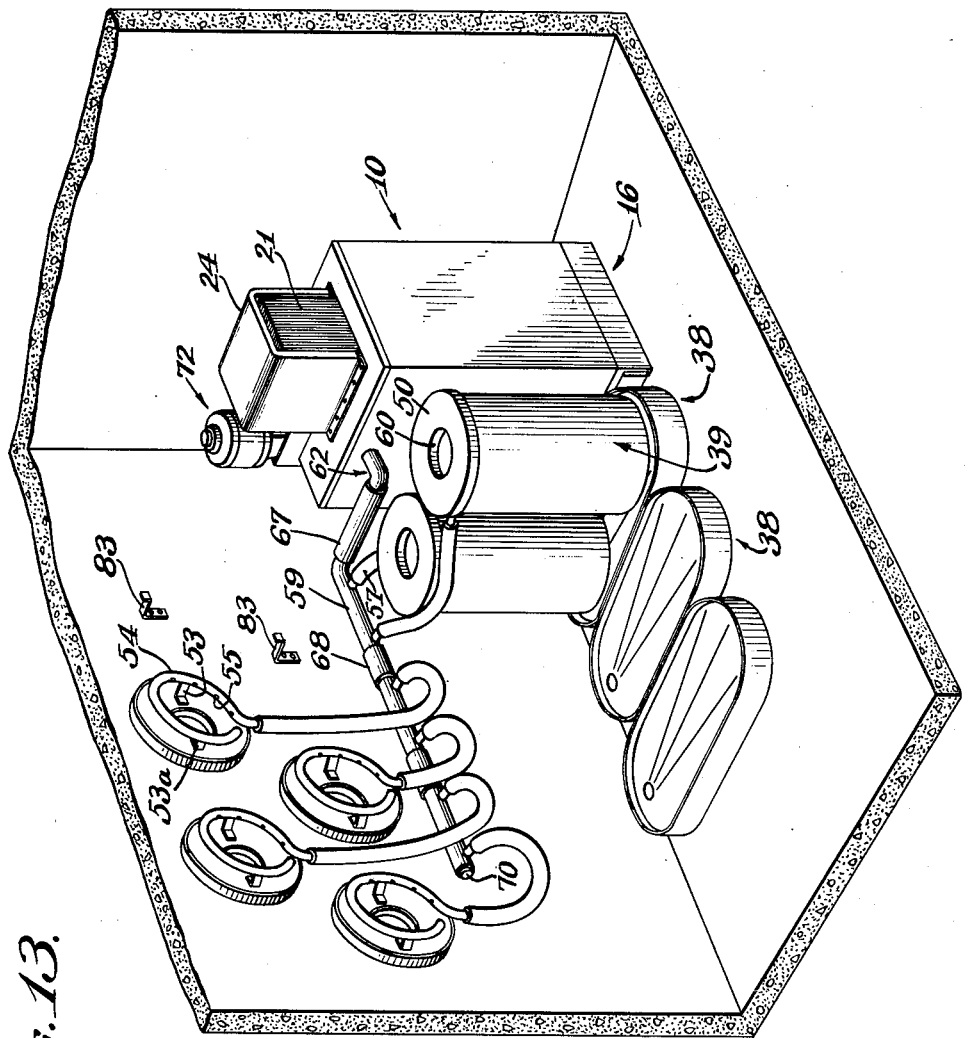
Fig. 13 is a perspective of the proposed cooler shown in an operative position within a housing or building structure.

In a preferred embodiment, as depicted in the accompanying drawings, the proposed liquid cooler includes a thermally insulated cabinet 10 which is fabricated with spaced apart inner and outer shells 11 and 12 having heat insulating material 13 packed in the space therebetween. A suitable heat-break structure, such, for instance, as is provided by any of the well-known breaker strip constructions, may be utilized as indicated at 14 to bridge the upper marginal edges of said inner and outer shells and seal off the insulation 13, while a removable lid or cover member 15 is positioned above said shells to complete the cabinet. If desired, of course, said lid or cover member could also be fashioned as an insulated assembly with spaced apart inner and outer surfaces having a heat insulating material therebetween. The cabinet 10 is adapted for positioning on a pedestal-like supporting base structure 16 which includes a horizontally extending base or supporting member 17 having a flange 18 depending therefrom and which has an inwardly turned footing 19 on the opposite end thereof. The flange 18, which depends from three sides of the base member 17, functions to space said member, and the cabinet 10 positioned thereupon, from a supporting floor structure or the like so as to admit a sump reservoir therebeneath, as will be hereinafter described.

The cabinet 10 carries the components of a refrigerating system which, as illustrated, includes a conventional hermetically sealed motor-compressor unit 20, a condenser 21, a condenser fan 22 and its electric driving motor 23, all of which are suitably mounted on the top of said lid or cover member 15. An open-ended hood-like bonnet or canopy 24 is positioned, preferably, over the refrigerating apparatus so that the cooling air pulled across the condenser surfaces by the fan 22 may thereafter be directed in a scrubbing action over and around the casing or housing of the motor-compressor unit 20 thereby aiding also in the cooling of said unit. A condenser shroud-like canopy 25 having a fan opening 26 therein may, if desired, be provided to direct the circulation of cooling air over the surfaces of said condenser. The refrigerant evaporator, which is generally represented by the numeral 27, comprises, preferably, two concentrically arranged portions, an inner coil 28 and an outer coil 29 that are connected together in series fashion. Both coils are suspended beneath the cover member 15 and are adapted for positioning within a tank-like compartment or reservoir 30 formed by the walls of the inner shell 11. Depending from the lower surface of said cover member 15 is an open-ended and substantially rectangularly-shaped tubular or hollow baffle member 31 which is positioned so that the inner evaporator or expansion coil 28 may be be wrapped therearound and be suitably affixed thereto for support. The outer coil 29, as shown, is fixedly positioned by a supporting structure, divided equally on opposite sides thereof, and each of which includes a vertically disposed angle member 32, affixed at one end thereof by suitable means such as the bolts 33 to the lower face of the cover 15, and a spacing and securing member 34 having a slot or notch 35 therein for each turn of the coil 29 and which fits over said coil and then, in turn, is suitably affixed as by welding or the like to its associated angle member 32. The spacing member 34 as so utilized thus serves to fixedly space and position successive turns of said outer coil. It will, of course, be understood that suitable refrigerant conducting pipes or conduits will be provided for connecting together the various components of the refrigerating apparatus whereby said apparatus will operate in conventional manner and in accordance with well understood principles of refrigeration. Such connections, however, have been omitted from the drawings for the purposes of simplification thereof.

In the space provided beneath the base portion of the cabinet support pedestal 16 there is positioned a removable pan-like container that functions as a sump or reservoir for spent cooling liquid. Said container, indicated generally by the reference character 36, is fashioned relatively shallow and otherwise dimensioned so as to be readily slidable beneath said pedestal. An inlet nipple 37 fixedly positioned in an opening in one wall thereof is adaptable for connection with other liquid collecting components as will be presently described.

A plurality of cooling stations, wherein articles such as cans containing milk or the like to be cooled are supported and sprayed with a liquid coolant which is subsequently collected in the lower portion thereof, are provided for disposition remote from said refrigerating apparatus cabinet, but such stations are connected to said apparatus by suitable liquid carrying means such as conduits or the like. As depicted, in the preferred embodiment illustrated, each such cooling station is fashioned so as to accommodate two transport-type milk cans, although it will be appreciated that no such limitation should be placed upon any such proposed structure since it is merely a matter of altering physical dimensions in order to modify the number of articles to be cooled that each such station may so accommodate. Successive additions of cooling stations may, of course, be continued within limits governed primarily by the cooling capacity of the associated refrigerating apparatus.

As illustrated, each individual cooling station may include a combination can or article-supporting and liquid collecting basin or pan, indicated generally by the reference character 38, and a shroud-like cover or hood that fits over the article being cooled. The combined support and collecting basin 38 may be formed as a pan-like container or receptacle having a raised base or floor member 40 that is suitably affixed between opposite sides of a continuously extending wall member 41 whose lower marginal edge may be inwardly turned to provide a footing-like flange 42. As shown the base or floor member 40 is formed integrally with the wall member 41 but it will be appreciated that it may be otherwise fashioned if so desired. The floor member 40, which may additionally function as a liquid drainage ramp, is fabricated so as to slope inwardly from all sides thereof toward a low point where a drainage outlet 43 is provided for removing any liquids collected thereon. If desired, said drainage ramp may be grooved as indicated at 44 to facilitate the drainage of liquid therealong. The drainage outlet 43, in turn, is fitted into a transversely extending section of a return conduit 45 which extends through slotted openings 46 and 46a in the wall member 41 and which, if so desired, may further be fixedly positioned therein by suitable securing means. A section of flexible conduit 47, such as a rubber hose or the like, connects one end of said return conduit to the nipple 37 of said sump reservoir, while a similar flexible conduit section 48 may connect the opposite end of said conduit to one end of a similar conduit associated with an adjoining collecting basin when more than one cooling station is utilized. A cork or plug 49 may, of course, be inserted to close the open end of the last conduit section in said return liquid line.

The shroud-like cover or bonnet 39, one of which is provided for each can or article being cooled, is fashioned, preferably with a cap member 50 that rests on a substantially cylindrically-shaped tubular shielding member 51. The marginal edge of said cap is downwardly bent to provide a continuously extending flange 52 that may overlie and closely engage the upper marginal edge of the shield member 51. Suitably secured to the inside of said cap and depending therefrom are two brackets 53 and 53a that support a shower-like spray header fashioned from a section of pipe or other tubular member bent through 360° to provide a ring-like member as indicated at 54. One end of said header ring is closed off or sealed closed by any suitable means, and a plurality of openings 55 disposed around the inner periphery of said ring provide spray outlets for the passage of a cooling liquid therefrom. The interior diameter of said spray ring is dimensioned, preferably, so that it may be positioned around the neck of a transport-type milk can 56 with or without the cover therefor in place. The open end of said spray header conduit is connected by a section of flexible conduit 57 to a nipple connection 58, in turn, connected into a header or manifold conduit 59 that forms part of a cooling liquid distribution system. The cap 50 of said shroud may also be formed with an opening 60 in the center thereof for the purpose of receiving freshly drawn milk directly into a can 56 previously positioned in a cooling station. In the latter instance, of course, the cover of said milk can would be removed before placing the shroud 39 therearound. A slotted opening 61 in the upper section of the wall of the shield portion 51 of said shroud is arranged to accommodate the end portion of the spray ring 54 that connects into the liquid distribution system.

Coolant liquid is conveyed out of the cooling liquid reservoir 30 and distributed to the can cooling stations by means of an outlet port connection 62 that opens at one end into said well or reservoir and connects at the other end with the header-like distribution assembly 63. Said outlet port connection includes an upwardly turned elbow portion 64 on the inner end thereof that is adapted to be positioned so that the opening thereof is disposed below the dead liquid level of the coolant liquid in said reservoir, a wall penetrating portion 65 that passes through aligned openings in the inner and outer shells of said cabinet, and a forwardly turned outer elbow portion 66 that joins the distribution assembly 63. The contacting edges of the openings in said shells and the adjoining surface of the penetrating portion 65 may be joined together in liquid-tight fashion by any suitable sealing means that will prohibit leakage of liquid from the reservoir 30. Said forwardly turned elbow portion 66 may be connected through a flexible coupling or conduit 67 to the manifold or header-like conduit 59, in turn, provided with a nipple connection 58 for each shrouded spray header to be operated therefrom. The opposite end of the manifold conduit 59 may, if more than one cooling station is to be used, be connected, in turn, through an additional flexible conduit or coupling 68 to another manifold-like conduit 69, and so forth, until the final cooling station is reached. The free end of the last such manifold conduit may then be closed by any suitable means such as the cork or plug 70.

In order to return spent cooling fluid, accumulated in the sump reservoir 36 from said cooling stations, to the cooling liquid reservoir 30 so that it may again be cooled and recirculated it is necessary that it be elevated substantially the heighth of the cabinet 10. For such purpose there is provided an electric motor-driven pump assembly, indicated by the overall reference character 71, which is mounted at one end of said cabinet. The pump device includes an electric driving motor 72 mounted on brackets 73 and 73a, in turn, fixedly secured to a trough-like channel 74 adapted for removable positioning over a portion of the upper marginal edges of said inner and outer cabinet shells. A slotted opening 75, in the top 15, of said cabinet, is provided to accommodate the pump through 74, while a turned-down elbow portion 76 on the inner end thereof opens into a second trough or channel 77, suspended beneath the top 15, which, in turn, discharges into the interior of the rectangular baffle 31 disposed in the cooling liquid reservoir 30. An opening in the bottom of the exterior portion of the said first trough 74 connects with a pump housing or penstock-like tubular member 78 that extends downwardly along the side of the cabinet 10 and through an opening in the base supporting pedestal 16 and then into the sump reservoir 36. A propeller shaft 79, positioned within said housing, is coupled by suitable coupling means at one end thereof to the shaft of the electric motor 72, while the opposite end is equipped with an impeller 80. One or more shaft bearing and journal supports, such as indicated at 81, may be provided to prevent distortion or whip in the shaft 79. Openings 82 in said journal support readily permit the passage of liquid therethrough.

The operation of the proposed cooler may be readily understood by reference to the accompanying drawings. The cooler may be set up in a location, such as indicated in Fig. 13, so that the spray headers when not in use may be hung or suspended on hooks 83 affixed to the wall structure at an elevation above that of the liquid level in the cooling liquid reservoir thus avoiding any necessity for plugging the spray openings in the distribution assembly. When placing the cooler in use a can containing milk, or any other such article it is desired be cooled, is positioned on the floor of a collecting basin 38 and the shroud shield 51 placed therearound and then the shroud cap 50 containing the spray header 54 is positioned thereover. As soon as the spray header is in position, such as around the neck of the milk-can, cooling liquid will flow by gravity out of the cooling liquid reservoir 30, through the distribution assembly 63, spray ring 54, and down over the sides of the can 56 to cool the contents thereof. The spent liquid is then drained by the sloping floor 49, of the collecting basin 38, to the return conduit line 45, from whence it flows to the sump reservoir 36. From said reservoir the liquid is elevated, by the impeller 80 and pump motor 72 through the housing 78, to the trough 74 from whence it will flow into trough 77 and then into the interior of the cooling liquid reservoir 30. The evaporator coils 28 and 29 operate to lower the temperature of the coolant liquid in said reservoir and during off-periods, such, for instance, as between milkings, an ice bank may be formed around said coils to provide reserve refrigeration capacity as is well understood in conventional liquid coolers.

The operation of the refrigerating apparatus is generally conventional in that compressed refrigerant is pumped from the motor compressor through the condenser and into the evaporator coils and then back to said compressor unit. The fan motor 23 drives the fan 22 which pulls air over the condenser surfaces to remove heat therefrom and subsequently said air is directed by means of the bonnet-like hood 24 in a scrubbing action over and around the housing of the motor-compressor unit, and, to a lesser degree over the pump motor 72, to also remove a limited amount of heat from both of said units. Since the controls for the refrigerating apparatus are generally conventional and so well understood in the art, no detailed description thereof has been given, and no reference made thereto in the drawings.

From the foregoing it should now be apparent that a novel spray-type liquid cooler has been illustrated and described. Furthermore, the proposed cooler represents a distinct advance in the art because it provides a cooler that offers the following advantages: It is readily flexible and may be easily expanded or contracted without having to effect permanent structural changes therein, and the shape or floor plan thereof may readily be modified to suit the space limitations of the milk house or barn; the amount of lifting required for loading and unloading is minimized; it is light in weight, occupies a minimum of floor space and may readily be transported from place to place; it is adaptable for receiving milk piped directly from the animal; its cooling liquid volume is minimized thus permitting more frequent changing of said liquid at minimum cost; it is highly efficient in operation because its heat transfer characteristics are good; it provides for accumulation of ice banks and the reserve refrigeration capacity resulting therefrom; it is inexpensive to fabricate because it is adaptable to mass production and the components thereof are inexpensive; the refrigerating apparatus may be removed from the insulated cabinet as a unit for servicing or replacement, as can also the pump assembly; it can be easily disassembled for shipping and the overall dimensions are small enough to permit its passage through narrow doorways; and, because of its sub-assembly type of construction, a considerable savings may be had in shipping and crating costs.

Although only a preferred embodiment of the invention has been illustrated, and that form described in detail, it will be apparent to those skilled in the art that various modifications may be made therein without departing from the spirit of the invention or from the scope of the appended claims.

What is claimed is:

1. A cooler of the class described, comprising in combination, a cabinet having a coolant liquid-containing tank therein, refrigerating apparatus carried by said cabinet and including an expansion coil disposed in said tank, a receptacle remotely disposed from said cabinet and adapted to support an article to be cooled, a separate shroud-like cover adapted to enclose the article to be cooled and including a cap having a shower member attached thereto and depending therefrom for spraying liquid and a tubular liquid confining shield having an open end upon which said cap is positioned, conduit means for delivering liquid from said tank to said shroud, said receptacle having liquid collecting means therein, and means for conducting liquid from said receptacle to said tank.

2. A cooler of the class described, comprising in combination, a cabinet having a coolant liquid-containing tank therein, refrigerating apparatus carried by said cabinet and including an expansion coil disposed in said tank, a receptacle remotely disposed from said cabinet and adapted to support an article to be cooled, a cap member having a ring-like shower device fixedly positioned therewithin and adapted for spraying liquid over an article to be cooled, an open-ended tubular member for confining liquid and adapted for positioning around an article to be cooled, said cap being fashioned for positioning in an overlapping and frictionally engaging relationship on one end of said tubular member, conduit means for delivering liquid from said tank to said shower cap member, said receptacle being provided with liquid collecting means therein, and means for conducting liquid from said receptacle to said tank.

3. A cooler of the class described, comprising in combination, a cabinet having a coolant liquid-containing tank therein, refrigerating apparatus carried by said cabinet and including an expansion coil disposed in said tank, a receptacle remotely disposed from said cabinet and adapted to support an article to be cooled, a cap member having a ring-like shower device fixedly positioned therewithin and adapted for spraying liquid over an article containing a liquid to be cooled, an open-ended tubular member for confining a coolant liquid therewithin and adapted for positioning around the article to be cooled, said cap being fashioned with an opening in the center thereof of less diameter than that of said shower ring so that the liquid to be cooled may be delivered through said opening and into an article disposed therebeneath for confining the liquid while being cooled, said cap being further arranged for positioning in an overlapping and functionally engaging relationship on one end of said tubular member, flexibly jointed conduit means for delivering liquid from said tank to said shower cap member, said receptacle being provided with liquid collecting means therein, and means for conducting liquid from said receptacle to said tank.

4. A cooler of the class described, comprising in combination, a cabinet having a coolant liquid-containing tank therein, refrigerating apparatus carried by said cabinet and including an expansion coil disposed in said tank, a plurality of receptacles remotely disposed from said cabinet and adapted to support at least one article to be cooled in each receptacle, individual shroud-like covers adapted to enclose the articles to be cooled, each of said shrouds having a shower member therein for spraying coolant liquid over an article to be cooled, conduit means including pipe for delivering coolant liquid from said tank to said shrouds, each of said receptacles being fashioned as a relatively shallow open top liquid-tight container having an elevated floor therein upon which the article to be cooled is positioned, and conduit means for conducting liquid from said receptacle to said tank.

5. A cooler of the class described, comprising in combination, a cabinet having a coolant liquid-containing tank therein, refrigerating apparatus carried by said cabinet and including an expansion coil disposed in said tank, a plurality of receptacles remotely disposed from said cabinet and adapted to support at least one article to be cooled in each receptacle, individual shroud-like covers adapted to enclose the articles to be cooled, each of said shrouds having a shower member therein for spraying coolant liquid over an article to be cooled, conduit means including flexibly jointed pipe for delivering coolant liquid from said tank to said shrouds, each of said receptacles being provided with an elevated article-supporting floor member that is fashioned so as to slope from all sides thereof toward a low-point outlet therein whereby coolant liquid collecting thereon may be drained to said outlet low-point for removal, and means including a flexibly jointed conduit for conducting coolant liquid from said low-point outlet of each receptacle back to said tank.

6. A cooler of the class described, comprising in combination, a cabinet having a coolant liquid-containing tank therein, refrigerating apparatus carried by said cabinet including an expansion coil disposed in said tank, stations remotely disposed from said cabinet and having means therein for supporting articles to be cooled, means for selectively spraying coolant liquid over the individual articles to be cooled, flexibly jointed conduit means for delivering coolant liquid from said tank to said spray means, said stations including liquid collecting means therein, a liquid-containing reservoir remote from said stations, conduit means for conducting liquid from said stations to said reservoir, and means including a pump for transferring liquid from said reservoir to said tank.

7. A cooler of the class described, comprising in combination, a cabinet having a coolant liquid-containing tank therein, a pedestal-like support adapted for supporting said cabinet in spaced relation to a floor structure therebeneath, a liquid-containing reservoir adapted for removable positioning within said pedestal support and beneath said cabinet, refrigerating apparatus carried by said cabinet including an expansion coil disposed in said cabinet tank, a station remotely disposed from said cabinet and having means therein for supporting an article to be cooled, means for spraying liquid over the article to be cooled, flexibly jointed conduit means for delivering coolant liquid from said tank to said spray means, said station being arranged with liquid collecting means therein, means including a flexibly jointed conduit for conducting liquid from said station to said reservoir, and means including a pump for transferring liquid from said reservoir to said tank.

8. A cooler of the class described, comprising in combination, a cabinet having a coolant liquid-containing tank therein, a support for carrying said cabinet in spaced relation above a supporting floor structure, a liquid-containing receptacle removably positioned beneath said cabinet, refrigerating apparatus carried by said cabinet including an expansion coil disposed in said tank, stations remotely disposed from said cabinet and having means therein for supporting articles to be cooled and for collecting liquid therein, means for spraying a coolant liquid over articles to be cooled, means including a flexibly jointed conduit for distributing coolant liquid from said tank to said spray means, means including a flexibly jointed conduit for conducting liquid from said stations to said receptacle, and means including a pump for transferring liquid from said receptacle to said tank.

9. A cooler of the class described, comprising in combination, a cabinet having a liquid-containing tank therein and provided with a removable cover, a hollow member depending from said cover and extending a substantial distance into said tank, a liquid-carrying trough opening into the upper end of said hollow member, refrigerating apparatus carried by said cabinet including an expansion coil disposed in said tank, stations remotely disposed from said cabinet and having means therein for supporting articles to be cooled, means for selectively spraying coolant liquid over the individual articles to be cooled, conduit means for distributing liquid from said tank to said spray means, said stations including liquid collecting means therein, a liquid-containing reservoir remote from said stations and disposed beneath said cabinet, conduit means for conducting liquid from said stations to said reservoir, and means including a pump for elevating liquid from said reservoir to said trough whereby liquid drained from said stations into said reservoir is transferred to said trough for discharge into the interior of said hollow member.

10. A cooler of the class described, comprising in combination, a cabinet having a liquid-containing tank therein and provided with a removable top cover, a tubular baffle member affixed at one end thereof to said cover and extending from said cover a substantial distance into said tank, a liquid-carrying trough suspended beneath said cover and arranged so that one end thereof opens into the interior of said tubular member, refrigerating apparatus carried by said cabinet including an expansion coil disposed in said tank, said coil being vertically positioned and arranged with a portion thereof wrapped around and secured to said baffle member, stations remotely disposed from said cabinet and having means therein for supporting articles to be cooled and for collecting liquid therein, means for selectively spraying liquid over the individual articles to be cooled, conduit means for distributing liquid from said tank to said spray means, a liquid-containing reservoir remote from said stations and disposed beneath said cabinet, conduit means for conducting liquid from said stations to said reservoir, and means including a pump for elevating liquid from said reservoir to said trough whereby liquid drained from said stations into said reservoir is transferred to said trough for discharge into the interior of said tubular baffle.

11. A cooler of the class described, comprising in combination, a cabinet having a liquid-containing tank therein, and further provided with a removable top cover; a hollow baffle member affixed at one end thereof to said cover and depending therefrom a substantial distance into said tank; a liquid-carrying trough disposed beneath said cover and arranged with an open end thereof extending into the interior of said hollow baffle; refrigerating apparatus including a motor-compressor, a fan, a fan motor, and a condenser mounted on the top of said cover, and a refrigerant evaporator disposed beneath said cover and extending into said tank; said evaporator including a plurality of coils concentrically arranged and connected in series flow relation with an inner coil thereof wrapped around and secured to said baffle; means for fixedly positioning an outer coil of said evaporator to said cabinet cover; receptacles remotely disposed from said cabinet and having means therein for supporting articles to be cooled and for collecting liquid therein; means for selectively spraying liquid over the individual articles to be cooled; conduit means for distributing liquid from said tank to said spray means; a liquid-containing reservoir remote from said receptacles and disposed beneath said cabinet; conduit means for conducting liquid from said receptacles to said reservoir; and means including a pump for transferring liquid from said reservoir to said trough, whereby liquid drained from said receptacles to said reservoir is elevated to said trough for discharge into the interior of said hollow baffle.

12. A cooler of the class described, comprising in combination: a cabinet having a liquid-containing tank therein and further provided with a removable top cover; a hollow baffle member affixed at one end thereof to said cover and depending therefrom a substantial distance into said tank; a liquid-carrying trough disposed beneath said cover and arranged with an open end thereof extending into the interior of said hollow baffle; refrigerating apparatus including a motor-compressor, a fan, a fan motor and a condenser mounted on the top of said cover; an open-ended hood superposed over said refrigerating apparatus so that cooling air entering one end thereof passes over the condenser surfaces and is confined within said hood to effect a scrubbing action over the remainder of said apparatus before discharging at an opposite end of the hood; a refrigerant evaporator disposed beneath said top cover and extending into said tank; said evaporator being fashioned as two coils connected together in a series refrigerant-flow relation and concentrically disposed to provide an inner and an outer coil; said inner evaporator coil being wrapped around said baffle and fixedly secured thereto; means depending from said cover for fixedly positioning said outer evaporator coil radially spaced from said inner coil; receptacles remotely disposed from said cabinet and having means therein for supporting articles to be cooled, and for collecting liquid therein; means for selectively spraying liquid over the individual articles to be cooled, conduit means for distributing liquid from said tank to said spray means; a liquid-containing reservoir remote from said receptacles and disposed beneath said cabinet; conduit means for conducting liquid from said receptacles to said reservoir; and means including a pump for transferring liquid from said reservoir to said trough, whereby liquid drained from said receptacles to said reservoir is elevated to said trough for discharge into the interior of said hollow member.

References Cited in the file of this patent

UNITED STATES PATENTS

| Number | Name | Date |
|---|---|---|
| 1,937,797 | Stafney | Dec. 5, 1932 |
| 2,031,274 | McKay | Feb. 18, 1936 |
| 2,140,744 | Hirsch | Dec. 20, 1938 |
| 2,252,173 | Gibson | Aug. 12, 1941 |
| 2,283,818 | Reiser | May 19, 1942 |
| 2,425,519 | Duncan | Aug. 12, 1947 |
| 2,575,094 | Chamberlain | Nov. 13, 1951 |